US010540769B2

(12) United States Patent
Pintoffl et al.

(10) Patent No.: US 10,540,769 B2
(45) Date of Patent: Jan. 21, 2020

(54) METHOD AND SYSTEM FOR ENHANCED ULTRASOUND IMAGE VISUALIZATION BY DETECTING AND REPLACING ACOUSTIC SHADOW ARTIFACTS

(71) Applicant: General Electric Company, Schenectady, NY (US)

(72) Inventors: Klaus Pintoffl, Oberosterreich (AT); Daniel Buckton, Oberosterreich (AT); Christian Perrey, Oberosterreich (AT)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 294 days.

(21) Appl. No.: 15/467,013

(22) Filed: Mar. 23, 2017

(65) Prior Publication Data

US 2018/0275258 A1 Sep. 27, 2018

(51) Int. Cl.
*G01S 7/52* (2006.01)
*G06T 7/11* (2017.01)

(52) U.S. Cl.
CPC ...... *G06T 7/11* (2017.01); *G06T 2207/10132* (2013.01)

(58) Field of Classification Search
CPC . G06T 11/60; G06T 7/11; G06T 5/005; G06T 5/50; G06T 2207/10132; G06T 2207/30012; G01S 15/8995; G01S 7/52077; G01S 7/52046; G01S 15/8925

USPC .......................................................... 367/7
See application file for complete search history.

(56) References Cited

U.S. PATENT DOCUMENTS 8,761,469 B2 * 6/2014 Kemp ...................... G06T 5/50
382/128

* cited by examiner

*Primary Examiner* — Daniel L Murphy
(74) *Attorney, Agent, or Firm* — McAndrews, Held & Malloy, Ltd.; Jacob Groethe; David Bates (57) ABSTRACT

An ultrasound probe acquires ultrasound images at different directions, such as by performing beam steering. A processor analyzes the ultrasound images to detect acoustic shadow artifacts. The processor marks the acoustic shadow artifacts detected in one or more regions of one or more of the analyzed ultrasound images. The processor constructs a compound image based on unmarked regions of the analyzed ultrasound images. The processor presents the constructed compound image at a display system. The processor applies an image recognition technique to identify whether a region of an ultrasound image includes a dark area. The processor compares image data of the region corresponding with a same location in each of the ultrasound images and detects the acoustic shadow artifacts in the region having the identified dark area if at least one of the analyzed ultrasound images does not include the dark area at the region corresponding with the same location.

20 Claims, 4 Drawing Sheets

Prior Art

METHOD AND SYSTEM FOR ENHANCED ULTRASOUND IMAGE VISUALIZATION BY DETECTING AND REPLACING ACOUSTIC SHADOW ARTIFACTS

FIELD

Certain embodiments relate to ultrasound imaging. More specifically, certain embodiments relate to a method and system for enhanced ultrasound image visualization by detecting and replacing acoustic shadow artifacts with ultrasound image data acquired from one or more different angles and/or directions.

BACKGROUND

Ultrasound imaging is a medical imaging technique for imaging organs and soft tissues in a human body. Ultrasound imaging uses real time, non-invasive high frequency sound waves to produce a two-dimensional (2D) image and/or a three-dimensional (3D) image. The sound waves transmitted into a region of interest are reflected and/or absorbed with each layer of tissue that is passed. Some structures allow the sound waves to pass through them more easily than others. For example, a small amount of energy may be absorbed by watery fluid, such as in an effusion or a cyst. Accordingly, regions lying behind the watery fluid may receive more of the ultrasonic signals than the processor of the ultrasound system expects for that depth, providing a uniformly brighter appearance. As another example, regions lying behind bone, such as the spine or ribs, may absorb and/or reflect more ultrasonic signals, leaving a dark acoustic shadow behind the structure.

Figure 1:
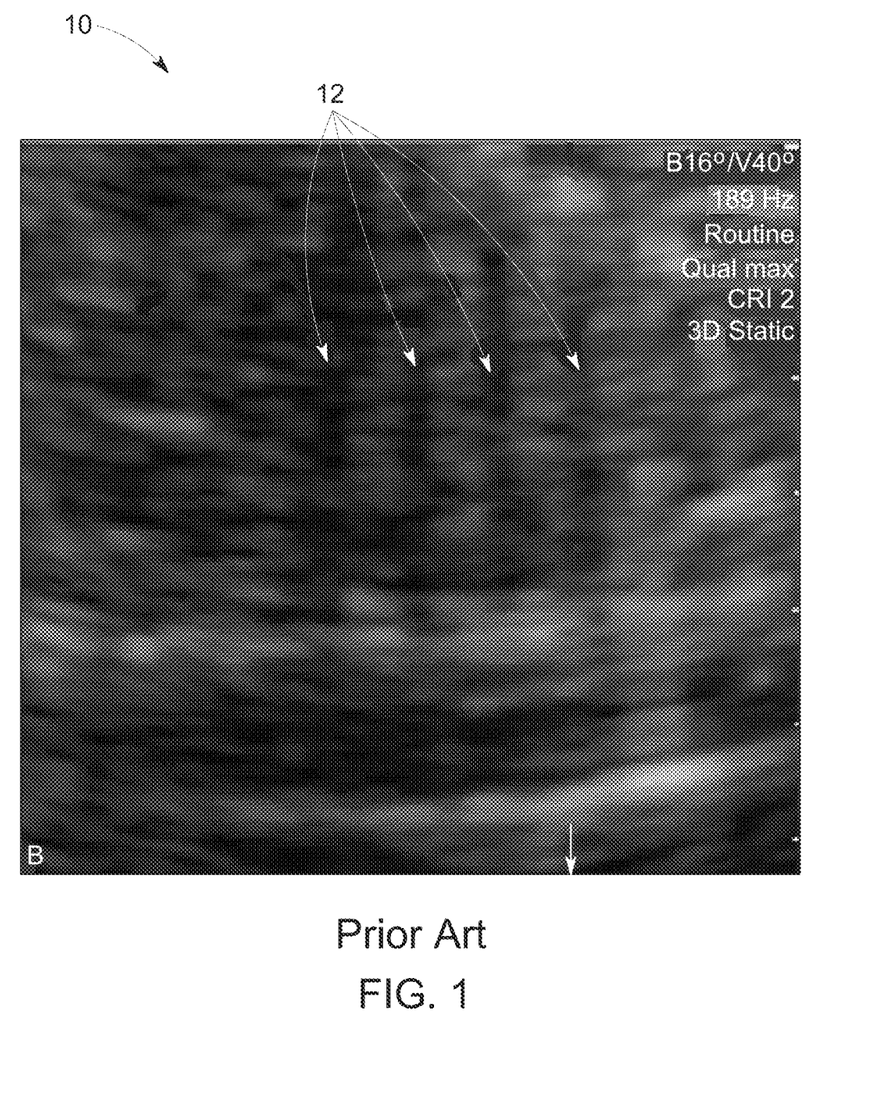
FIG. 1 illustrates an exemplary fetal ultrasound image as known in the art.

FIG. 1 illustrates an exemplary fetal ultrasound image 10 as known in the art. Referring to FIG. 1, the fetal ultrasound image 10 may include acoustic shadow artifacts 12 from bones, such as the spine or ribs. In fetal ultrasound, for example, the visibility of structures may depend on the fetal position. Examining structures, such as the fetal heart, may be difficult due to acoustic shadow artifacts 12 created by the ribs and/or spine. In practice, an ultrasound operator may attempt to alter the angle in which the ultrasound probe touches the skin of the patient. Additionally and/or alternatively, a change of angle may be achieved via beam steering. Spatial compounding typically employs beam steering to transmit/receive ultrasound beams at multiple distinct beam angles which insonify a common region, from which multiple images are formed. The individual images may be detected, resampled onto a common grid, and combined in order to produce better image quality. One of the image quality attributes improved by spatial compounding is reduced shadowing artifacts. Although spatial compounding may help reduce shadow artifacts, acoustic shadows may still be present and/or otherwise detectable in ultrasound images acquired with spatial compounding.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for enhanced ultrasound image visualization by detecting and replacing acoustic shadow artifacts with ultrasound image data acquired from one or more different angles and/or directions, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Certain embodiments may be found in a method and system for providing enhanced ultrasound image visualization by detecting and replacing acoustic shadow artifacts with ultrasound image data acquired from one or more different angles and/or directions. For example, various aspects have the technical effect of enhancing ultrasound image visualization by: (1) detecting acoustic shadow artifacts in a plurality of images acquired from different directions via beam steering, and (2) reconstructing a compound image using non-shadowed regions of the plurality of images. Moreover, certain embodiments have the technical effect of enhancing ultrasound image visualization by: (1) detecting acoustic shadow artifacts in focused beams along different directions within acquired unfocused single channel data, and (2) displaying an image using non-shadowed regions of the focused beams.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present disclosure. The following detailed description is, therefore, not to be taken in a limiting sense, and the scope of the present disclosure is defined by the appended claims and their equivalents.

As used herein, an element or step recited in the singular and preceded with the word "a" or "an" should be understood as not excluding plural of said elements or steps, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode, CF-mode and/or sub-modes of CF such as TVI, Angio, B-flow, BMI, BMI_Angio, and in some cases also MM, CM, PW, TVD, CW where the "image" and/or "plane" includes a single beam or multiple beams.

Furthermore, the term processor or processing unit, as used herein, refers to any type of processing unit that can carry out the required calculations needed for the disclosure, such as single or multi-core: CPU, Graphics Board, DSP, FPGA, ASIC or a combination thereof.

Moreover, although certain embodiments in the foregoing description may describe acoustic shadow artifacts caused by the spine and/or ribs of a fetus, for example, unless so claimed, the scope of various aspects of the present disclosure should not be limited to fetal ultrasound and may additionally and/or alternatively be applicable to image(s) of any suitable structure, where the image(s) may be processed to remove acoustic shadow artifacts from the image(s).

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". Also, forming of images may be performed using channel combinations that may originate from more than one transmit event (e.g., synthetic aperture techniques).

In various embodiments, ultrasound processing to form images is performed, for example, including ultrasound beamforming, such as receive beamforming, in software, firmware, hardware, or a combination thereof. One implementation of an ultrasound system having a software beamformer architecture formed in accordance with various embodiments is illustrated in FIG. 2.

Figure 2:
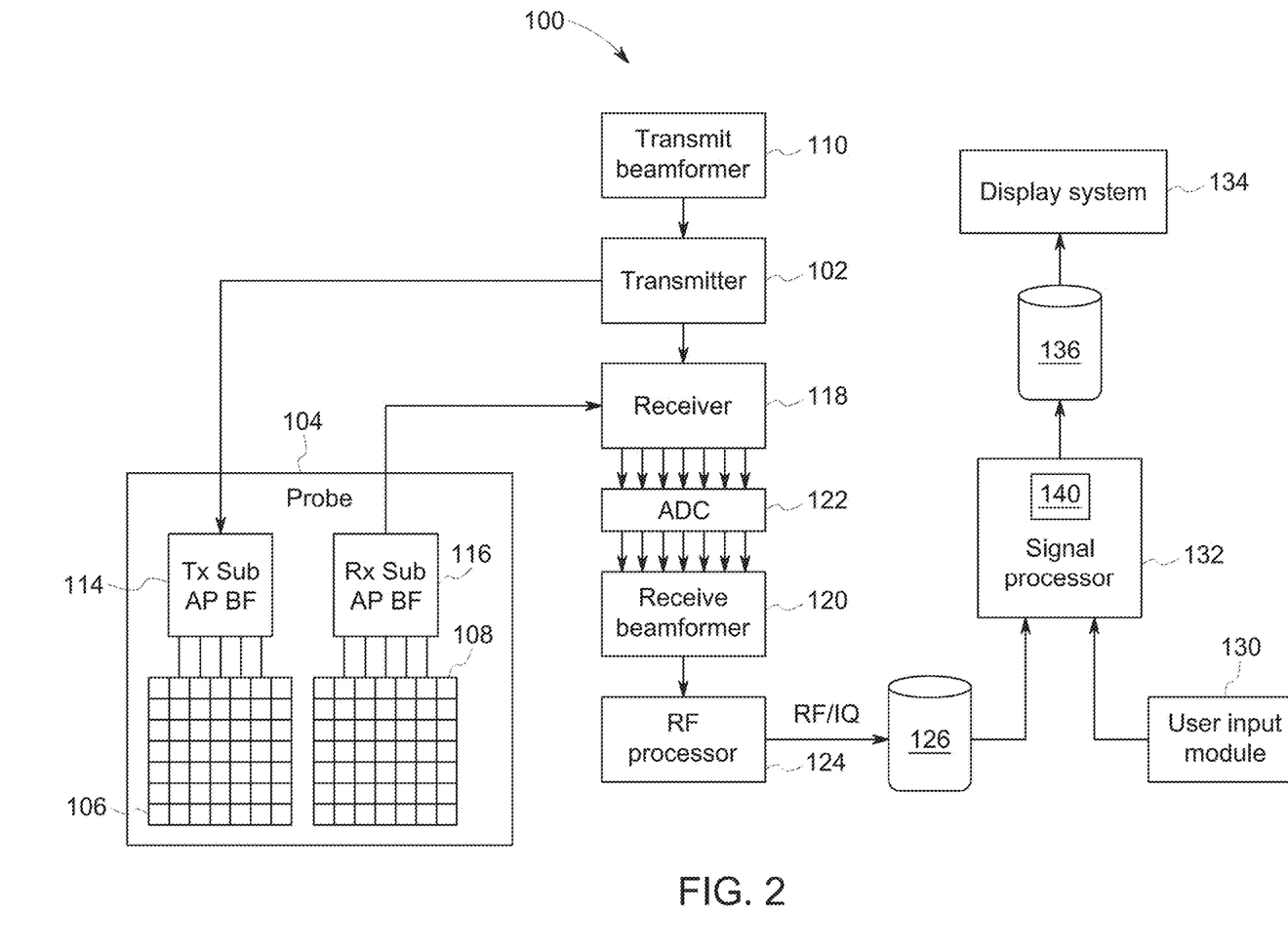
FIG. 2 is a block diagram of an exemplary ultrasound system that is operable to provide enhanced ultrasound image visualization by detecting and replacing acoustic shadow artifacts with ultrasound image data acquired from one or more different angles and/or directions, in accordance with an embodiment.

FIG. 2 is a block diagram of an exemplary ultrasound system 100 that is operable to provide enhanced ultrasound image visualization by detecting and replacing acoustic shadow artifacts 12 with ultrasound image data acquired from one or more different angles and/or directions, in accordance with an embodiment. Referring to FIG. 2, there is shown an ultrasound system 100. The ultrasound system 100 comprises a transmitter 102, an ultrasound probe 104, a transmit beamformer 110, a receiver 118, a receive beamformer 120, a RF processor 124, a RF/IQ buffer 126, a user input module 130, a signal processor 132, an image buffer 136, and a display system 134.

The transmitter 102 may comprise suitable logic, circuitry, interfaces and/or code that may be operable to drive an ultrasound probe 104. The ultrasound probe 104 may comprise a two dimensional (2D) array of piezoelectric elements. The ultrasound probe 104 may comprise a group of transmit transducer elements 106 and a group of receive transducer elements 108, that normally constitute the same elements.

The transmit beamformer 110 may comprise suitable logic, circuitry, interfaces and/or code that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 108.

The group of receive transducer elements 108 in the ultrasound probe 104 may be operable to convert the received echoes into analog signals, undergo sub-aperture beamforming by a receive sub-aperture beamformer 116 and are then communicated to a receiver 118. The receiver 118 may comprise suitable logic, circuitry, interfaces and/or code that may be operable to receive and demodulate the signals from the receive sub-aperture beamformer 116. The demodulated analog signals may be communicated to one or more of the plurality of A/D converters 122.

The plurality of A/D converters 122 may comprise suitable logic, circuitry, interfaces and/or code that may be operable to convert the demodulated analog signals from the receiver 118 to corresponding digital signals. The plurality of A/D converters 122 are disposed between the receiver 118 and the receive beamformer 120. Notwithstanding, the disclosure is not limited in this regard. Accordingly, in some embodiments, the plurality of A/D converters 122 may be integrated within the receiver 118.

The receive beamformer 120 may comprise suitable logic, circuitry, interfaces and/or code that may be operable to perform digital beamforming processing to, for example, sum the delayed channel signals received from the plurality of A/D converters 122 and output a beam summed signal. The resulting processed information may be converted back to corresponding RF signals. The corresponding output RF signals that are output from the receive beamformer 120 may be communicated to the RF processor 124. In accordance with some embodiments, the receiver 118, the plurality of A/D converters 122, and the beamformer 120 may be integrated into a single beamformer, which may be digital.

The RF processor 124 may comprise suitable logic, circuitry, interfaces and/or code that may be operable to demodulate the RF signals. In accordance with an embodiment, the RF processor 124 may comprise a complex demodulator (not shown) that is operable to demodulate the RF signals to form I/Q data pairs that are representative of the corresponding echo signals. The RF or I/Q signal data may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

The user input module 130 may be utilized to input patient data, scan parameters, settings, configuration parameters, change scan mode, and the like. In an exemplary embodiment, the user input module 130 may be operable to configure, manage and/or control operation of one or more components and/or modules in the ultrasound system 100. In this regard, the user input module 130 may be operable to configure, manage and/or control operation of transmitter 102, the ultrasound probe 104, the transmit beamformer 110, the receiver 118, the receive beamformer 120, the RF processor 124, the RF/IQ buffer 126, the user input module 130, the signal processor 132, the image buffer 136, and/or the display system 134.

The signal processor 132 may comprise suitable logic, circuitry, interfaces and/or code that may be operable to process ultrasound scan data (i.e., RF signal data or IQ data pairs) for generating an ultrasound image without acoustic shadow artifacts for presentation on a display system 134. The signal processor 132 is operable to perform one or more processing operations according to a plurality of selectable ultrasound modalities on the acquired ultrasound scan data. In an exemplary embodiment, the signal processor 132 may be operable to perform compounding, motion tracking, and/or speckle tracking. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation. In an exemplary embodiment, the signal processor 132 may comprise a shadow artifact processing module 140.

The ultrasound system 100 may be operable to continuously acquire ultrasound scan data at a frame rate that is suitable for the imaging situation in question. Typical frame rates range from 20-70 but may be lower or higher. The acquired ultrasound scan data may be displayed on the display system 134 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several seconds' worth of frames of ultrasound scan data. The frames of ultrasound scan data are stored in a manner to facilitate retrieval thereof according to its order or time of acquisition. The image buffer 136 may be embodied as any known data storage medium.

The signal processor 132 may include a shadow artifact processing module 140 that comprises suitable logic, circuitry, interfaces and/or code that may be operable to process ultrasound scan data to identify image regions having shadows and replace the shadowed image data with non-shadowed image data from one or more images acquired at a different direction. For example, the shadow artifact processing module 140 may apply image detection techniques and/or algorithms to automatically identify shadows in each of a set of images or beams acquired at different directions. The image detection techniques and/or algorithms may search each image or beam in the set acquired at different directions for image data corresponding with shadows, such as image data having lower local intensities (i.e., a dark area in the image data). The shadow artifact processing module 140 may compare a same location on beams or images acquired from different directions of insonation. The shadow artifact processing module 140 may distinguish between shadows and areas of image data that are dark for other reasons, such as the presence of fluid, among other things, by determining whether the dark image data is present at the same location in the beams or images acquired from the different directions of insonation. For example, the shadow artifact processing module 140 may determine that the dark area in a first image or beam is a shadow if other images or beams provide image data not having the dark area at the same location. As another example, the shadow artifact processing module 140 may determine that the dark area in a first image or beam is not a shadow if all of the other images or beams provide image data also having the dark area at the same location.

In various embodiments, the shadow artifact processing module 140 may generate an image that does not include the detected shadows 12. For example, the shadow artifact processing module 140 may mark shadowed regions in each image of a series of images acquired at different directions. The term "mark" is used to refer to any suitable mechanism for the shadow artifact processing module 140 to determine which analyzed regions of each image or beam included detected shadows. For example, marking may include discarding image data, storing information about the image regions in a table, physically marking the image data region having the shadow, or any suitable mechanism for distinguishing between regions having detected shadows and regions not having detected shadows. The shadow artifact processing module 140 may reconstruct a compound image using only the unmarked regions of the series of images such that the regions having shadows are eliminated and/or otherwise not included in the reconstructed compound image. As another example, the shadow artifact processing module 140 may generate an image based on unfocused single channel data acquired with a software beamformer. The shadow artifact processing module 140 may compute focused beams at different directions, examine regions of the focused beams for shadow artifacts 12, and generate an image having only the non-shadowed image data by discarding or otherwise ignoring the shadows 12 in the computed focused beams. In various embodiments, the non-shadowed images generated by the shadow artifact processing module 140 may be presented at the display system 134.

Figure 3:
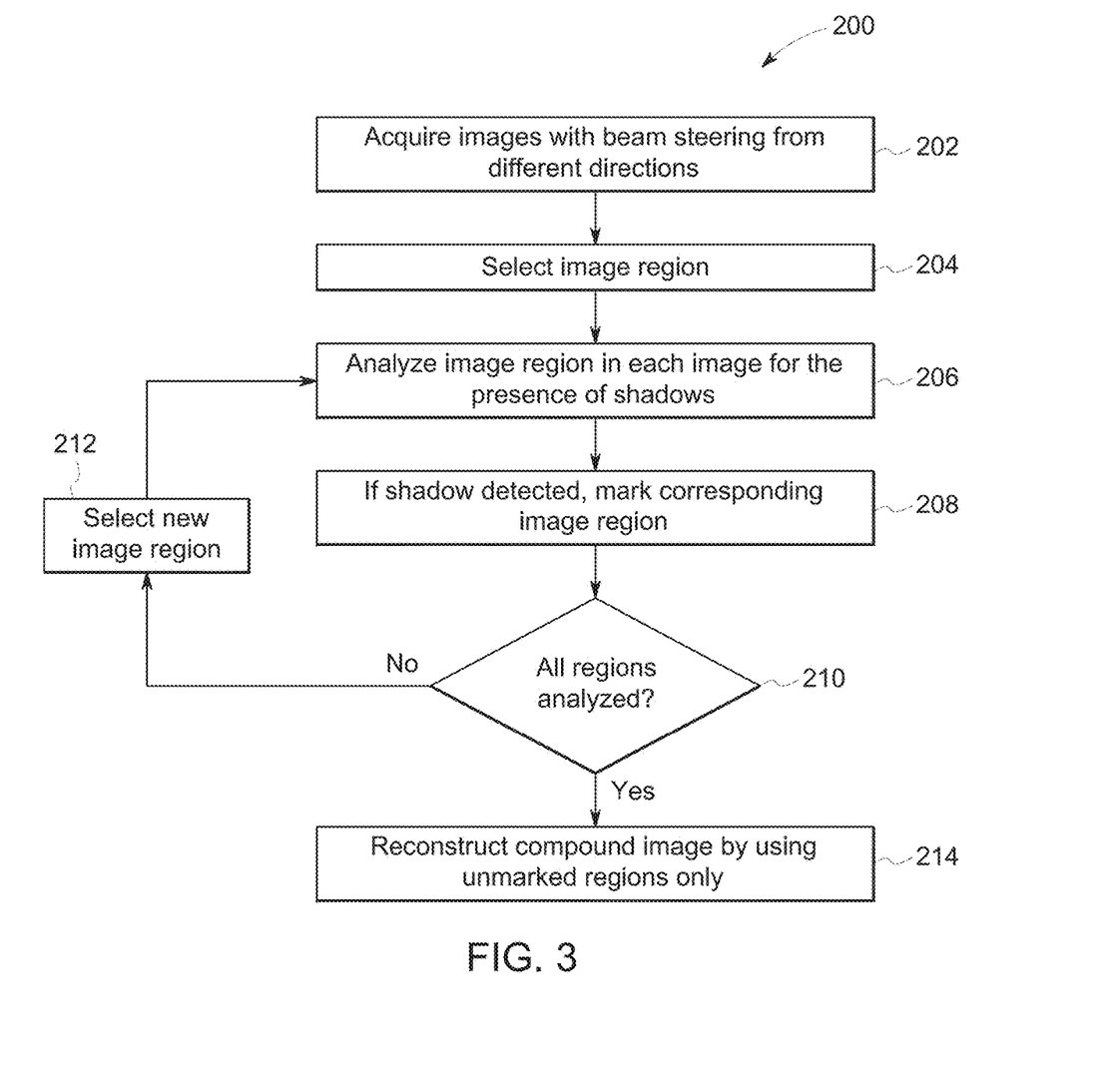
FIG. 3 is a first flow chart illustrating exemplary steps that may be utilized for providing enhanced ultrasound image visualization by detecting and replacing acoustic shadow artifacts with ultrasound image data acquired from one or more different angles and/or directions, in accordance with an embodiment.

FIG. 3 is a first flow chart 200 illustrating exemplary steps 202-214 that may be utilized for providing enhanced ultrasound image visualization by detecting and replacing acoustic shadow artifacts 12 with ultrasound image data acquired from one or more different angles and/or directions, in accordance with an embodiment. Referring to FIG. 3, there is shown a flow chart 200 comprising exemplary steps 202 through 214. Certain embodiments of the present disclosure may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 202, an ultrasound system 100 may acquire images from different directions. For example, the ultrasound system 100 may perform beam steering to transmit/receive ultrasound beams at multiple distinct beam angles which insonify a common region, from which multiple images are formed. In various embodiments, the number of images acquired may be 3-10 images; however, acquiring more or less images is contemplated.

At step 204, a processor 132 of the ultrasound system 100 may select a region of at least a subset of the ultrasound images acquired at step 202. For example, each acquired image may comprise a plurality of common regions. The common regions may be a same location insonified from a different direction.

At step 206, the shadow artifact processing module 140 of the signal processor 132 may analyze the selected image region in at least a subset of the acquired ultrasound images for the presence of shadows. For example, the shadow artifact processing module 140 may apply image recognition techniques to identify whether the selected region of the ultrasound images comprises a dark area that may indicate a shadow. The shadow artifact processing module 140 may compare the image data of the selected region corresponding with a same location in each of the analyzed ultrasound images. The shadow artifact processing module 140 may detect that acoustic shadow artifacts are present in the selected region of one or more of the analyzed ultrasound images if the selected region comprises the dark area in at least one of, but not all of, the analyzed ultrasound images. The shadow artifact processing module 140 may refrain from detecting the acoustic shadow artifacts in the selected region of one or more of the analyzed ultrasound images if the selected region comprises the dark area in all of the analyzed ultrasound images. For example, the shadow artifact processing module 140 may operate under the assumption that shadowed areas are only shadowed from certain directions, whereas areas that are dark due to other reasons, such as the presence of fluid, would be dark from any direction.

At step 208, if a shadow is detected at step 206, the shadow artifact processing module 140 of the signal processor 132 may mark the corresponding image region in each of the analyzed ultrasound images having the detected acoustic shadow artifacts. For example, the image region may be marked by discarding the image regions having the acoustic shadow artifacts, recording information identifying the image regions having the shadow artifacts, providing markers within the image data to identify the image regions having the acoustic shadow artifacts, applying a weighting factor to the image based on an amount or probability of detected acoustic shadow artifacts, or any suitable mechanism for distinguishing, sorting, weighting, and/or separating the image regions having acoustic shadow artifacts from the image regions that do not have acoustic shadow artifacts.

At step 210, the shadow artifact processing module 140 of the signal processor 132 may determine if all of the regions of at least a subset of the acquired ultrasound images have been analyzed. If all of the regions have not been analyzed, the method 200 may proceed to step 212 to select a region of at least a selected subset of the ultrasound images acquired at step 202 that have not been analyzed. Steps 206 through 210 may then be repeated until all of the regions of the at least the selected subset of the ultrasound images have been analyzed. Once all of the regions of the at least the selected subset of the ultrasound images have been analyzed, the method proceeds to step 214.

At step 214, the shadow artifact processing module 140 of the signal processor 132 may reconstruct a compound image based on unmarked regions of the ultrasound images. For example, the regions of the ultrasound images that have not been discarded or otherwise identified as having acoustic shadow artifacts may be compounded to generate the compound image. The compound image does not include shadow artifacts. The method 200 effectively eliminates shadow artifacts from the compound image and/or otherwise prevents shadow artifacts from being included in the compound image. The compound image may be presented at a display system 134.

Additionally and/or alternatively, at step 214, the shadow artifact processing module 140 of the signal processor 132 may reconstruct a compound image based on weighting factors that may be applied to regions of the ultrasound images at step 208. For example, the shadow artifact processing module 140 of the signal processor 132 may assign weighting factors to image regions of at least the selected subset of the ultrasound images. The weighting factors may be based on an amount or a probability of acoustic shadow artifacts detected in each of the image regions of each of the ultrasound images. The shadow artifact processing module 140 may apply the assigned weights when reconstructing a compound image.

Figure 4:
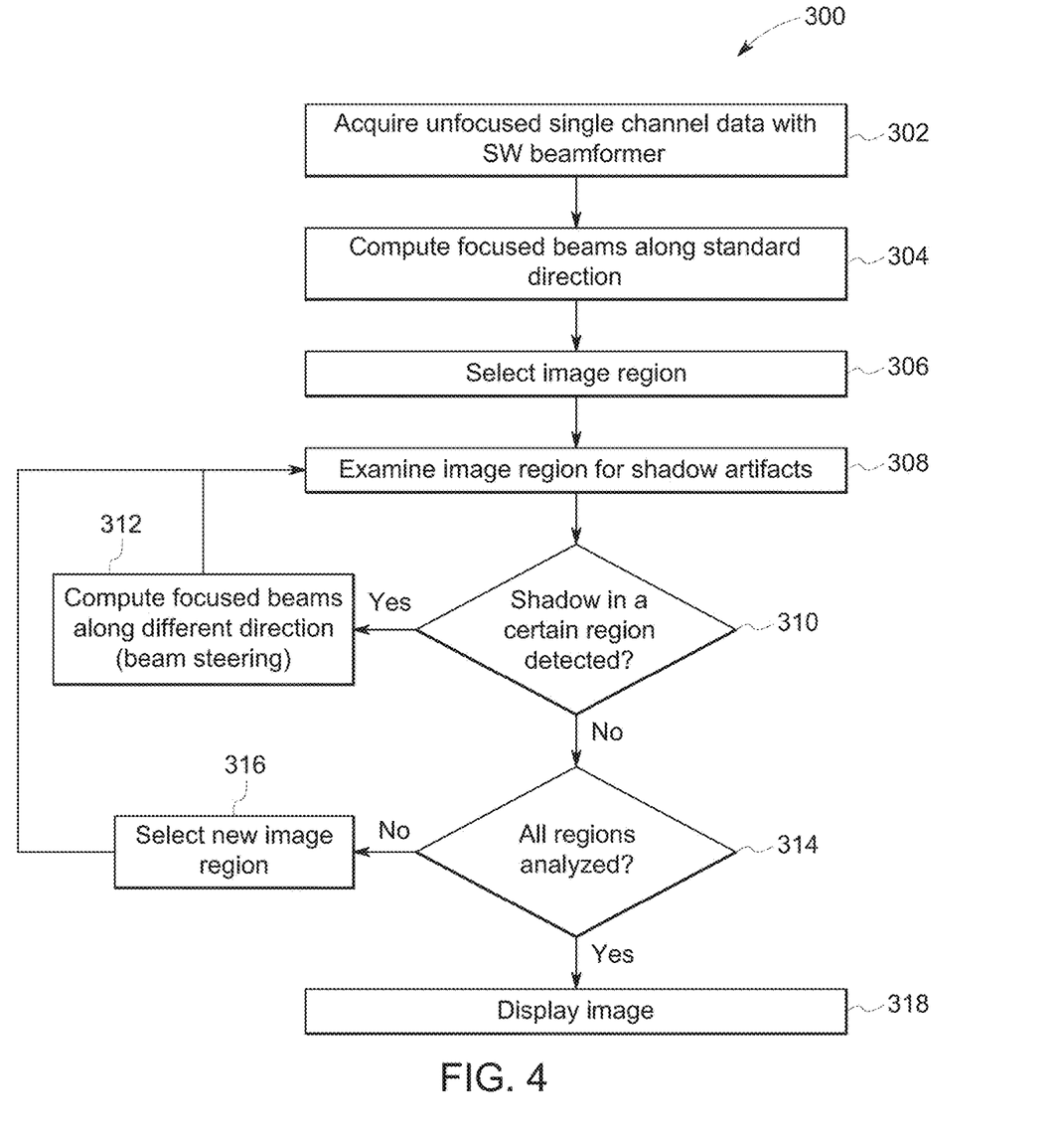
FIG. 4 is a second flow chart illustrating exemplary steps that may be utilized for providing enhanced ultrasound image visualization by detecting and replacing acoustic shadow artifacts with ultrasound image data acquired from one or more different angles and/or directions, in accordance with an embodiment.

FIG. 4 is a second flow chart 300 illustrating exemplary steps 302-318 that may be utilized for providing enhanced ultrasound image visualization by detecting and replacing acoustic shadow artifacts 12 with ultrasound image data acquired from one or more different angles and/or directions, in accordance with an embodiment. Referring to FIG. 4, there is shown a flow chart 300 comprising exemplary steps 302 through 318. Certain embodiments of the present disclosure may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 302, an ultrasound system 100 having a software beamformer may acquire unfocused single channel ultrasound data. At step 304, a processor of the ultrasound system 100 may compute focused beams along a standard direction from the unfocused single channel ultrasound data acquired at step 302. At step 306, a processor 132 of the ultrasound system 100 may select a region of focused beams along the standard direction computed at step 304.

At step 308, the shadow artifact processing module 140 of the signal processor 132 may analyze the selected image region in the computed focused beams along the standard direction for the presence of shadows. For example, the shadow artifact processing module 140 may apply image recognition techniques to identify whether the selected region in the computed focused beams comprises a dark area that may indicate a shadow. At step 310, if a dark area is detected in the selected region of the computed focused beams, the shadow artifact processing module 140 may compute focused beams along a different direction at step 312. The method 300 may return to step 308 to examine the focused beams along the different direction computed at step 312. Referring again to step 310, the shadow artifact processing module 140 may compare the image data of the selected region corresponding with a same location in each of the focused beams computed along the standard direction and the different direction(s). The shadow artifact processing module 140 may detect that acoustic shadow artifacts 12 are present in the selected region of one or more focused beams along the standard and different direction(s) if the selected region comprises the dark area in at least one of, but not all of, the focused beams. The shadow artifact processing module 140 may refrain from detecting the acoustic shadow artifacts 12 in the selected region of one or more focused beams along the standard and different direction(s) if the selected region comprises the dark area in all of the focused beams. For example, the shadow artifact processing module

140 may operate under the assumption that shadowed areas are only shadowed from certain directions, whereas areas that are dark due to other reasons, such as the presence of fluid, would be dark from any direction.

At step 314, the shadow artifact processing module 140 of the signal processor 132 may determine if all of the regions of the focused beams computed along standard and different direction(s) have been analyzed. If all of the regions of the focused beams have not been analyzed, the method 300 may proceed to step 316 to select a region of the focused beams that has not been analyzed. Steps 308 through 314 may then be repeated until all of the regions of the focused beams have been analyzed. Once all of the regions of the focused beams have been analyzed, the method proceeds to step 318.

At step 318, the shadow artifact processing module 140 of the signal processor 132 may generate and present an image that does not include image data from the focused beams having shadow artifacts. The method 300 effectively eliminates shadow artifacts from the image and/or otherwise prevents shadow artifacts from being included in the image. The image may be presented at a display system 134.

Aspects of the present disclosure provide a method 200 and system 100 for providing enhanced ultrasound image visualization by detecting and replacing acoustic shadow artifacts 12 with ultrasound image data acquired from one or more different angles and/or directions. In accordance with various embodiments, the method 200 comprises acquiring 202, by an ultrasound probe 104, a plurality of ultrasound images. Each of the plurality of ultrasound images may be acquired at a different direction. The method 200 comprises analyzing 206, by a processor 132, 140, at least a subset of the plurality of ultrasound images to detect acoustic shadow artifacts 12. The method 200 comprises marking 208, by the processor 132, 140, the acoustic shadow artifacts 12 detected in one or more regions of one or more of the analyzed plurality of ultrasound images. The method 200 comprises constructing 214, by the processor 132, 140, a compound image based on unmarked regions of the analyzed plurality of ultrasound images.

In certain embodiments, the method 200 comprises presenting the constructed compound image at a display system 134. In various embodiments, the acquiring 202 the plurality of ultrasound images comprises performing beam steering. In a representative embodiment, the analyzing 206 at least the subset of the plurality of ultrasound images comprises applying an image recognition technique to identify whether a region of the one or more regions of the one or more analyzed plurality of ultrasound images comprises a dark area. In certain embodiments, the analyzing 206 at least the subset of the plurality of ultrasound images comprises comparing image data of the region corresponding with a same location in each of the at least the subset of the plurality of ultrasound images. In various embodiments, the analyzing 206 at least the subset of the plurality of ultrasound images comprises detecting the acoustic shadow artifacts 12 in the region having the identified dark area if at least one of the analyzed plurality of ultrasound images comprises image data other than the dark area at the region corresponding with the same location. In a representative embodiment, the analyzing 206 at least the subset of the plurality of ultrasound images comprises refraining from detecting the acoustic shadow artifacts 12 in the region having the identified dark area if all of the analyzed plurality of ultrasound images comprises the identified dark area at the region corresponding with the same location. In certain embodiments, the method comprises selectively discarding, by the processor 132, 140, the image data of the region having the detected acoustic shadow artifacts 12.

Various embodiments provide a system 100 for enhanced ultrasound image visualization by detecting and replacing acoustic shadow artifacts 12 with ultrasound image data acquired from one or more different angles and/or directions. The system 100 comprises an ultrasound probe 104 configured to acquire a plurality of ultrasound images. Each of the plurality of ultrasound images may be acquired at a different direction. The system 100 comprises a processor 132, 140 configured to analyze at least a subset of the plurality of ultrasound images to detect acoustic shadow artifacts 12. The processor 132, 140 is configured to mark the acoustic shadow artifacts 12 detected in one or more regions of one or more of the analyzed plurality of ultrasound images. The processor 132, 140 is configured to construct a compound image based on unmarked regions of the analyzed plurality of ultrasound images.

In a representative embodiment, the system 100 comprises a display system 134. The processor 132, 140 is configured to present the constructed compound image at the display system 134. In certain embodiments, the ultrasound probe 104 is configured to acquire the plurality of ultrasound images by performing beam steering. In various embodiments, the processor 132, 140 is configured to analyze at least the subset of the plurality of ultrasound images by at least applying an image recognition technique to identify whether a region of the one or more regions of the one or more analyzed plurality of ultrasound images comprises a dark area. In a representative embodiment, the processor 132, 140 is configured to analyze at least the subset of the plurality of ultrasound images by comparing image data of the region corresponding with a same location in each of the at least the subset of the plurality of ultrasound images. The processor 132, 140 is configured to analyze at least the subset of the plurality of ultrasound images by detecting the acoustic shadow artifacts 12 in the region having the identified dark area if at least one of the analyzed plurality of ultrasound images comprises image data other than the dark area at the region corresponding with the same location. The processor 132, 140 is configured to analyze at least the subset of the plurality of ultrasound images by refraining from detecting the acoustic shadow artifacts 12 in the region having the identified dark area if all of the analyzed plurality of ultrasound images comprises the identified dark area at the region corresponding with the same location. In various embodiments, the processor 132, 140 is configured to selectively discard the image data of the region having the detected acoustic shadow artifacts 12.

Certain embodiments provide a non-transitory computer readable medium having stored thereon, a computer program having at least one code section. The at least one code section is executable by a machine for causing the machine to perform steps. The steps 200 include acquiring 202 a plurality of ultrasound images. Each of the plurality of ultrasound images may be acquired at a different direction. The steps 200 include analyzing 206 at least a subset of the plurality of ultrasound images to detect acoustic shadow artifacts 12. The steps 200 include marking 208 the acoustic shadow artifacts 12 detected in one or more regions of one or more of the analyzed plurality of ultrasound images. The steps 200 include constructing 214 a compound image based on unmarked regions of the analyzed plurality of ultrasound images.

In various embodiments, the steps 200 include presenting the constructed compound image at a display system 134. In a representative embodiment, the acquiring 202 the plurality of ultrasound images comprises performing beam steering. In certain embodiments, the analyzing 206 at least the subset of the plurality of ultrasound images comprises applying an image recognition technique to identify whether a region of the one or more regions of the one or more analyzed plurality of ultrasound images comprises a dark area. In various embodiments, the analyzing 206 at least the subset of the plurality of ultrasound images comprises comparing image data of the region corresponding with a same location in each of the at least the subset of the plurality of ultrasound images. The analyzing 206 at least the subset of the plurality of ultrasound images comprises detecting the acoustic shadow artifacts 12 in the region having the identified dark area if at least one of the analyzed plurality of ultrasound images comprises image data other than the dark area at the region corresponding with the same location. The analyzing 206 at least the subset of the plurality of ultrasound images comprises refraining from detecting the acoustic shadow artifacts 12 in the region having the identified dark area if all of the analyzed plurality of ultrasound images comprises the identified dark area at the region corresponding with the same location. In a representative embodiment, the steps 200 include selectively discarding the image data of the region having the detected acoustic shadow artifacts 12.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for providing enhanced ultrasound image visualization by detecting and replacing acoustic shadow artifacts with ultrasound image data acquired from one or more different angles and/or directions.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
    acquiring, by an ultrasound probe, a plurality of ultrasound images, each of the plurality of ultrasound images comprising a common location acquired at a different direction;
    analyzing, by a processor, at least a subset of the plurality of ultrasound images to detect acoustic shadow artifacts;
    marking, by the processor, the acoustic shadow artifacts detected in one or more regions of one or more of the analyzed plurality of ultrasound images; and
    constructing, by the processor, a compound image based on unmarked regions of the analyzed plurality of ultrasound images.

2. The method according to claim 1, comprising presenting the constructed compound image at a display system.

3. The method according to claim 1, wherein the acquiring the plurality of ultrasound images comprises performing beam steering.

4. The method according to claim 1, wherein the analyzing at least the subset of the plurality of ultrasound images comprises applying an image recognition technique to identify whether a region of the one or more regions of the one or more analyzed plurality of ultrasound images comprises a dark area.

5. The method according to claim 4, wherein the analyzing at least the subset of the plurality of ultrasound images comprises comparing image data of the region corresponding with a same location in each of the at least the subset of the plurality of ultrasound images.

6. The method according to claim 5, wherein the analyzing at least the subset of the plurality of ultrasound images comprises detecting the acoustic shadow artifacts in the region having the identified dark area if at least one of the analyzed plurality of ultrasound images comprises image data other than the dark area at the region corresponding with the same location.

7. The method according to claim 6, comprising selectively discarding, by the processor, the image data of the region having the detected acoustic shadow artifacts.

8. The method according to claim 5, wherein the analyzing at least the subset of the plurality of ultrasound images comprises refraining from detecting the acoustic shadow artifacts in the region having the identified dark area if all of the analyzed plurality of ultrasound images comprises the identified dark area at the region corresponding with the same location.

9. A system comprising:
an ultrasound probe configured to acquire a plurality of ultrasound images, each of the plurality of ultrasound images comprising a common location acquired at a different direction; and
a processor configured to:
analyze at least a subset of the plurality of ultrasound images to detect acoustic shadow artifacts;
mark the acoustic shadow artifacts detected in one or more regions of one or more of the analyzed plurality of ultrasound images; and
construct a compound image based on unmarked regions of the analyzed plurality of ultrasound images.

10. The system according to claim 9, comprising a display system, and wherein the processor is configured to present the constructed compound image at the display system.

11. The system according to claim 9, wherein the ultrasound probe is configured to acquire the plurality of ultrasound images by performing beam steering.

12. The system according to claim 9, wherein the processor is configured to analyze at least the subset of the plurality of ultrasound images by at least applying an image recognition technique to identify whether a region of the one or more regions of the one or more analyzed plurality of ultrasound images comprises a dark area.

13. The system according to claim 12, wherein the processor is configured to analyze at least the subset of the plurality of ultrasound images by at least:
comparing image data of the region corresponding with a same location in each of the at least the subset of the plurality of ultrasound images,
detecting the acoustic shadow artifacts in the region having the identified dark area if at least one of the analyzed plurality of ultrasound images comprises image data other than the dark area at the region corresponding with the same location, and
refraining from detecting the acoustic shadow artifacts in the region having the identified dark area if all of the analyzed plurality of ultrasound images comprises the identified dark area at the region corresponding with the same location.

14. The system according to claim 13, wherein the processor is configured to selectively discard the image data of the region having the detected acoustic shadow artifacts.

15. A non-transitory computer readable medium having stored thereon, a computer program having at least one code section, the at least one code section being executable by a machine for causing the machine to perform steps comprising:
acquiring a plurality of ultrasound images, each of the plurality of ultrasound images comprising a common location acquired at a different direction;
analyzing at least a subset of the plurality of ultrasound images to detect acoustic shadow artifacts;
marking the acoustic shadow artifacts detected in one or more regions of one or more of the analyzed plurality of ultrasound images; and
constructing a compound image based on unmarked regions of the analyzed plurality of ultrasound images.

16. The non-transitory computer readable medium according to claim 15, comprising presenting the constructed compound image at a display system.

17. The non-transitory computer readable medium according to claim 15, wherein the acquiring the plurality of ultrasound images comprises performing beam steering.

18. The non-transitory computer readable medium according to claim 15, wherein the analyzing at least the subset of the plurality of ultrasound images comprises applying an image recognition technique to identify whether a region of the one or more regions of the one or more analyzed plurality of ultrasound images comprises a dark area.

19. The non-transitory computer readable medium according to claim 18, wherein the analyzing at least the subset of the plurality of ultrasound images comprises:
comparing image data of the region corresponding with a same location in each of the at least the subset of the plurality of ultrasound images,
detecting the acoustic shadow artifacts in the region having the identified dark area if at least one of the analyzed plurality of ultrasound images comprises image data other than the dark area at the region corresponding with the same location, and
refraining from detecting the acoustic shadow artifacts in the region having the identified dark area if all of the analyzed plurality of ultrasound images comprises the identified dark area at the region corresponding with the same location.

20. The non-transitory computer readable medium according to claim 19, comprising selectively discarding the image data of the region having the detected acoustic shadow artifacts.

* * * * *